United States Patent [19]
Zech

[11] 3,767,323
[45] Oct. 23, 1973

[54] CONTROL MEANS PRIMARILY FOR ROTARY-WING AIRCRAFT

[75] Inventor: Hans Zech, Munich, Germany

[73] Assignee: Messerschmitt-Bolkow-Blohm GmbH, Munich, Germany

[22] Filed: June 21, 1972

[21] Appl. No.: 264,900

[52] U.S. Cl. .................................. 416/98, 416/114
[51] Int. Cl. .............................................. B64c 27/74
[58] Field of Search ...................... 416/98, 113, 114, 416/156

[56] References Cited
UNITED STATES PATENTS

| | | | |
|---|---|---|---|
| 2,919,081 | 12/1959 | Schön | 416/114 X |
| 2,969,117 | 1/1961 | Schön | 416/114 |
| 3,256,780 | 6/1966 | Riley et al. | 416/114 X |
| 3,572,965 | 3/1971 | Scheibe | 416/114 X |

Primary Examiner—Everette A. Powell, Jr.
Attorney—Woodhams, Blanchard and Flynn

[57] ABSTRACT

Blade control means primarily for rotary-wing aircraft. There are provided two control plates coaxially positioned on a common axis and each subject directly or indirectly to manual control. A first thereof is arranged for universal movement about a substantially fixed center located in said axis and the other thereof is arranged for movement in and along said axis at a substantially fixed orientation, usually normal, to said axis. At least three or more voltage changing devices operable in response directly to linear motion are arranged between said plates and positioned at equal angular spacing therearound. The output of said voltage changing devices is then conducted to means for controlling servomotors which in a conventional manner control the blade angle of the wings of said rotary-winged aircraft.

4 Claims, 2 Drawing Figures

CONTROL MEANS PRIMARILY FOR ROTARY-WING AIRCRAFT

FIELD OF THE INVENTION

The invention relates to a rotary-wing aircraft with at least one wobble plate for effecting cyclic and simultaneous blade pitch control and servomotors for effecting changes in blade pitch.

BACKGROUND OF THE INVENTION

In the case of rotors of rotary-wing aircraft, both cyclic and simultaneous pitch change is accomplished usually by use of a wobble plate in connection with hydraulic servomotors which are mechanically controlled. The mechanical control of the servomotors in the manner that a wobble plate which is associated with said servomotors is both adjustable to effect cyclic changes in the angle of incidence and also is movable axially for simultaneous changes in the angle of incidence, requires, however, a complicated control mechanism of control rods or cables, shift levers and combination gearing. This all requires a considerable amount of space in the aircraft and accounts for a substantial amount of the weight of the aircraft. Moreover, there exists the danger that elastic deformations of parts of the control mechanism or of aircraft components may lead to control errors. To balance out such deformations, additional measures are required, particularly when longer controlled systems are to be utilized.

Similar problems exist also in so-called tilt rotors of rigid aircraft.

The purpose of the invention is therefore to devise means by which in a rotary-wing aircraft of the type mentioned above, the above-described mechanical input control mechanism can be omitted. The reference to rotary-wing aircraft includes also fixed wing aircraft with propulsion air screws (so called tilt rotors) which are swingable into a lift position.

To attain this purpose the invention provides a first control input plate which is swingable by the control stick and which is supported for tilting toward all sides and a second control input plate which is arranged coaxially to said first control input plate and which is axially movable by means of the pitch change lever. The invention further provides at least three electrical slide rheostats which extend between, and approximately perpendicular to, the two control input plates, are arranged equally spaced around the periphery of said control input plates and which are connected conductively to the associated servomotors for their control. Said slide rheostats consist each of a core member and a wiper rod movably arranged with respect to each core member, whereby one end of the core member is connected for universal pivoting with respect to the one control input plate and one end of the wiper rod is connected for universal pivoting with respect to the other control input plate.

Thus, in such a control mechanism, the position of the wobble plate is determined by two control input plates, of which the universally tiltable one serves for the input of cyclic control signals and the axially movable one for the input of simultaneous control signals. The overlapping of the cyclic and the simultaneous control signals is accomplished by means of the slide rheostats, whereby according to a further application of the invention the wiper rods are connected to the universally tiltable control input plate and the core members to the axially movable control input plate.

Through this arrangement, it is possible in a simple manner to electrically control at least three servomotors which are associated with the wobble plate and which are arranged equally spaced around the periphery in such a manner that the wobble plate always assumes exactly the position determined by the two control input plates. For this, the slide rheostats which are advantageously used as potentiometers deliver the electrical signals, namely, as voltage values which are exactly analogous to the cyclic and simultaneous control signals applied mechanically through the control input plates.

Compared with the common mechanical-hydraulic pitch controls, the described pitch control is of a substantially lighter weight and when same are mounted in an aircraft cell, a much better adjustment to each local condition is possible. Finally, all elastic deformations of the aircraft components are without any effect on the exactness of the control.

BRIEF DESCRIPTION OF THE DRAWINGS

One exemplary embodiment of the invention is discussed more in detail hereinafter in connection with the drawing, in which.

DETAILED DESCRIPTION

Figures 1, 2:
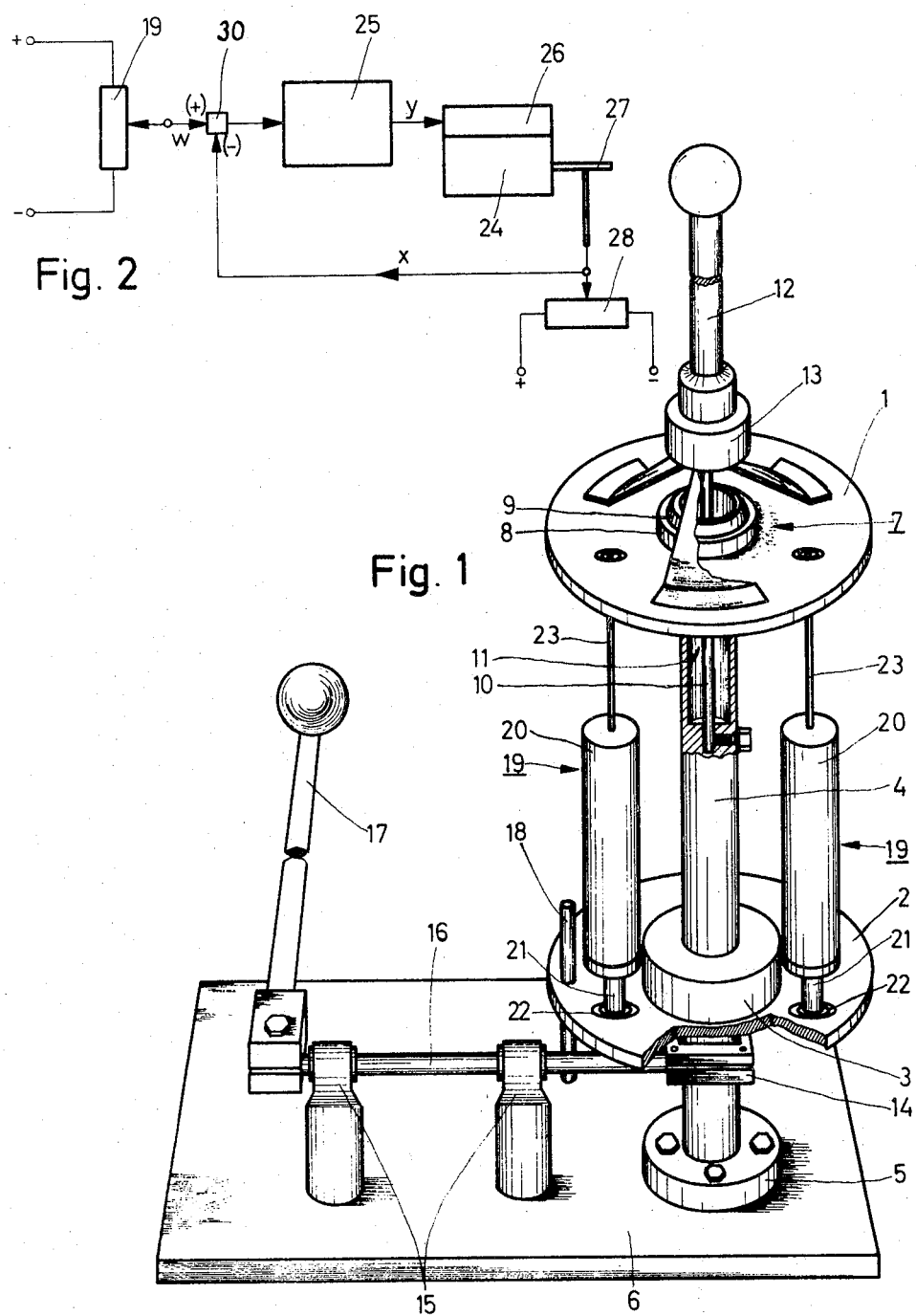
FIG. 1 is a perspective view of a control input plate which consists of a tiltable and an axially movable plate and FIG. 2 is a block diagram of a control circuit for a hydraulic servomotor.

FIG. 1 illustrates two coaxially superposed plates 1 and 2, the lower one of which is supported through a cylindrical guide sleeve 3 on a cylindrical shaft 4. The lower end of the shaft 4 is stationarily arranged by means of a flange 5 on a base plate 6. The upper plate 1 is connected to the free end of the shaft 4 through a ball-and-socket joint 7, in which a ring 8 with spherically constructed slide surfaces is movable around a ball part 9 which is mounted on the shaft end, said ring being inserted in the center of the plate 1. Rotation of the plate 1 relative to the shaft 4 is prevented by means of a flexible rod 10 which is arranged free-standing in a bore 11 extending approximately through the upper third of the shaft 4, said rod 10 being fixedly connected both to the shaft 4 and also to the control stick 12 which is in turn fixed to the plate 1. Thus the plate 1 can only be tilted relative to the shaft 4 by means of the control stick 12. Said control stick is secured on said plate by a so-called three-legged spider 13.

The lower plate 2 is movable on the shaft 4 by fork means 14 which is connected to a pitch change lever 17 through a rod 16 which is rotatably arranged in fixed bearings 15 of any convenient construction. By lifting the pitch change lever 17, this plate 2 is moved by the fork piece 14 in direction of the (upper) tiltable plate 1. By using as the fork piece 14, means partly grip around the shaft 4 to function as a shifting element, special elements for securing the rod 16 against axial movement are not needed.

The lower plate 2 is also nonrotatable, just like the tiltable plate 1. To accomplish this, a cylindrical pin 18 which is parallel to the shaft 4 is inserted through a bore of the plate 2 with minimal clearance. It is understood that for the same purpose it is also possible to provide splines between the plate 2 and the shaft 4. However, by utilizing the cylindrical pin 18 it is possible in a simpler manner to provide an adjustable stop for limiting the axial movability of the plate 2. Thus, in effect, the plate 1 is universally tiltable about a fixed point on shaft 4 in response to the control 12 and the plate 2 remains in a given orientation, usually normal, to the axis of shaft 4 but is slidable therealong in response to the control 17.

As further appearing in FIG. 1, slide rheostats 19 are arranged between the two plates 1 and 2, of which slide rheostats one is covered by the shaft 4 in the chosen illustration. Thus there are three slide rheostats 19 which are angularly spaced 120° from each other around the plates. Each of slide rheostats 19 is a bar rheostat with wiper rods arranged within core members 20. The core members 20 are each secured on a pedestal 21; these pedestals 21 are connected to the lower plate 2, conveniently by ball-and-socket joints 22 the construction of which may correspond substantially to that of the already described ball-and-socket joint 7. Universal, as ball-and-socket, joint connections are provided between the wiper rods 23 of the slide rheostats and the tiltable plate 1. By this means, the wiper rods 23 and the core members 20 can be moved with respect to one another by the plates 1 or 2 in directions nearly in parallel to the shaft 4 without canting.

FIG. 1 dispenses with illustrating electric circuitry through which the slide rheostats 19 are, for example, connected to a not-illustrated voltage source. The slide rheostats 19 are thus used as potentiometers whereby, depending on the position of the tiltable plate 1 and the position of the movable plate 2, voltage values determined thereby are amplified and are used thereafter for controlling three hydraulic servomotors of which one is indicated at 24. These servomotors are associated in a conventional operative manner with a not-illustrated conventional rotor wobble plate. This is illustrated in FIG. 2, wherein there is shown for simplicity only one slide rheostat 19 and only one servomotor 24. The association of slide rheostat 19/servomotor 24 is, of course, the same in all servomotors. It is understood that the servomotors 24 on the rotor wobble plate are also arranged angularly spaced 120° from one another.

According to FIG. 2, the voltage value (nominal value $w$) which is taken off from the slide rheostat 19, is led to a comparator 30 whose output is supplied to a variable gain amplifier 25, for example, a proportional amplifier, which amplifies same and appears as a regulating signal $y$ for a control valve 26 of the servomotor 24. The actual value $x$ indicating the actual amount of shifting of the servomotor piston rod 27 is measured by a potentiometer 28 which is coupled with it and is returned to the comparator 30 at the input end of the variable gain amplifier 25. Same then compares the nominal value $w$ with the actual value $x$. If a difference exists, the value of the regulating signal $y$ changes automatically. Each rheostat is provided with an identical circuit by which its output controls one of the servomotors controlling the wobble plate. In this manner the shifting of each piston rod 27, or of a not-illustrated push rod coupled therewith in the rotor wobble plate, always corresponds exactly to the voltage values taken from each slide rheostat 19 which voltage values embody analoges in electrical signals to the mechanical control demands which are fed in through the two plates 1 and 2 by means of the control stick 12 or the pitch change lever 17.

The embodiments of the invention in which an exclusive property or privilege is claimed are defined as follows:

1. Rotary-wing aircraft with at least one wobble plate for the cyclic and simultaneous pitch control and servomotors for the pitch change, characterized by a control input plate (1) which is swingable by the control stick (12) and which is supported for universal tilting and a control input plate (2) which is arranged coaxially to said control input plate (1) and which is axially movable by means of the pitch change lever (17) and further characterized by at least three electrical slide rheostats (19) which extend between and approximately perpendicularly to the two control input plates, and are arranged at equal angular spacing around the periphery of said control input plates and are connected in circuit with the associated servomotors (24) for their control, said slide rheostats consisting each of a core member (20) and a wiper rod (23) movably arranged in said core member, whereby one end of each core member is connected for universal pivoting with respect to the one control input plate and one end of each wiper rod is connected for universal pivoting with respect to the other control input plate.

2. Rotary-wing aircraft according to claim 1, characterized in that the wiper rods (23) are connected to the universally tiltable control input plate (1) and the core members (20) are connected to the axially movable control input plate (2).

3. Control means for rotary-winged aircraft which aircraft has at least one wobble plate for both the cyclic and simultaneous pitch control of the wings thereof and servomotors for effecting operation of said wobble plate, said control means including:
a shaft and means mounting same in a fixed position with respect to the aircraft;
a first control input plate responsive to movement of a first control device and mounted on said shaft for universal pivotal movement about a single point on said shaft;
a second control plate responsive to movement of a second control device and arranged in fixed orientation with respect to said shaft and movable axially therealong;
at least three control devices operable in response to rectilinear motion, said devices arranged between said control plates and spaced angularly therearound, one end of each of said control devices being arranged for universal pivotal connection to the first of said control plates and the other end of each of said control devices being arranged for universal pivotal connection to the other control plate, the output of said control devices being applied to said servomotors;
whereby actuation of the first of said control plates will energize said servomotors in a selected pattern and actuation of the second of said control plates will actuate said servomotors simultaneously.

4. Rotary-wing aircraft with at least one wobble plate for the cyclic and simultaneous pitch control and servomotors for the pitch change, characterized by a control input plate (1) which is swingable by the control stick (12) and which is supported for universal tilting and a control input plate (2) which is arranged coaxially to said control input plate (1) and which is axially movable by means of the pitch change lever (17), and further characterized by at least three voltage changing devices operating by rectilinear mechanical motion extending between, connected to, and arranged normally to two control input plates, and are arranged at equal angular spacing around the periphery of said control input plates and are connected in circuit with the associated servomotors (24) for their control.

* * * * *

UNITED STATES PATENT OFFICE
CERTIFICATE OF CORRECTION

Patent No. 3,767,323    Dated October 23, 1973

Inventor(s) Hans Zech

It is certified that error appears in the above-identified patent and that said Letters Patent are hereby corrected as shown below:

On page 1 of the Patent please add the "Foreign Application Priority Data," German Application Serial No. P 21 31 023.6, filed June 23, 1971.

Column 4, line 6; delete "with" insert ---having---.

line 8; delete "characterized by", insert ---comprising:---.

line 9; delete "(1)".

delete "the", replace with ---a---.

line 10; delete "(12)".

line 11; delete "(2)".

line 12; delete "(1)".

line 13; delete "the" insert ---a---.

delete "(17) and fur-" and insert --- , ---.

line 14; delete "ther characterized by".

line 15; delete "(19)".

UNITED STATES PATENT OFFICE
CERTIFICATE OF CORRECTION

Patent No. 3,767,323          Dated October 23, 1973

Inventor(s) Hans Zech                        page - 2

It is certified that error appears in the above-identified patent and that said Letters Patent are hereby corrected as shown below:

Column 4, line 17; delete "and".

line 19; delete "(24)".

line 21; delete "(20)" and "(23)".

line 27; delete "charac-".

line 28; delete "terized in that" and insert ---wherein---. Delete "(23)".

line 29; delete "(1)".

line 30; delete "(20)".

line 31; delete "(2)".

line 61; delete "with" insert ---having---.

line 63; delete "characterized by" and insert ---comprising:---.

line 64; delete "(1)".

delete "the" insert ---a---.

line 65; delete "(12)".

line 66; delete "(2)".

UNITED STATES PATENT OFFICE
CERTIFICATE OF CORRECTION

Patent No. 3 767 323　　　　　　　　Dated October 23, 1973

Inventor(s) Hans Zech　　　　　　　　page - 3

It is certified that error appears in the above-identified patent and that said Letters Patent are hereby corrected as shown below:

Column 4, line 67; delete "(1)".

Column 5, line  1; delete "the" insert ---a---.

delete "(17), and fur-".

line  2; delete "ther characterized by" insert --- , ---.

Column 6, line  2; delete "the".

line  3; delete "(24)".

Signed and sealed this 27th day of August 1974.

(SEAL)
Attest:

McCOY M. GIBSON, JR.　　　　　　　C. MARSHALL DANN
Attesting Officer　　　　　　　　　Commissioner of Patents